(12) United States Patent
Ueki

(10) Patent No.: US 6,867,871 B2
(45) Date of Patent: Mar. 15, 2005

(54) MOIRÉ GRATING NOISE ELIMINATING METHOD

(75) Inventor: Nobuaki Ueki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 192 days.

(21) Appl. No.: 10/388,092

(22) Filed: Mar. 14, 2003

(65) Prior Publication Data

US 2003/0184766 A1 Oct. 2, 2003

(30) Foreign Application Priority Data

Mar. 28, 2002 (JP) ........................................ 2002-093311

(51) Int. Cl.[7] .............................................. G01B 11/30
(52) U.S. Cl. ....................... 356/605; 356/604
(58) Field of Search ................................ 356/605, 604, 356/601, 498, 499, 500

(56) References Cited

U.S. PATENT DOCUMENTS 3,762,818 A * 10/1973 Johnson et al. .............. 356/605

* cited by examiner

Primary Examiner—Gregory J. Toatley, Jr.
Assistant Examiner—Roy M. Punnoose
(74) Attorney, Agent, or Firm—Snider & Associates; Ronald R. Snider

(57) ABSTRACT

A moving distance of a moiré grating in y direction is set with respect to a grating pitch of a moiré grating, whereas an imaging magnification of imaging means is set according to the relationship between the pixel pitch of an image pickup device in the imaging means and the size of grating pitch when forming an image on the image pickup device. An image of moiré fringes is captured each time when the moiré grating is moved by a predetermined distance in the y direction, so as to yield a predetermined number of y-direction positional moiré fringe images, which are then averaged. According to thus obtained average moiré fringe image, shape information of a surface to be inspected is determined.

8 Claims, 3 Drawing Sheets

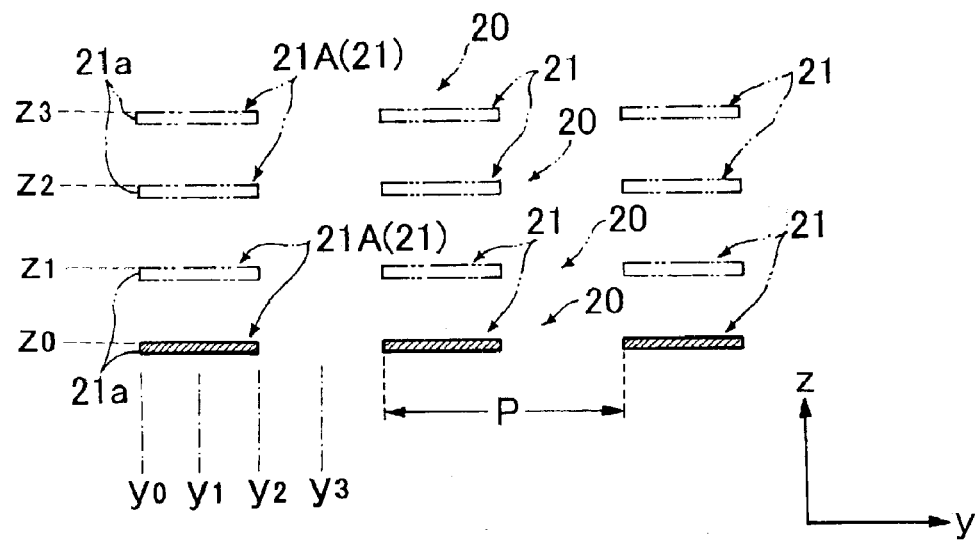
FIG.2
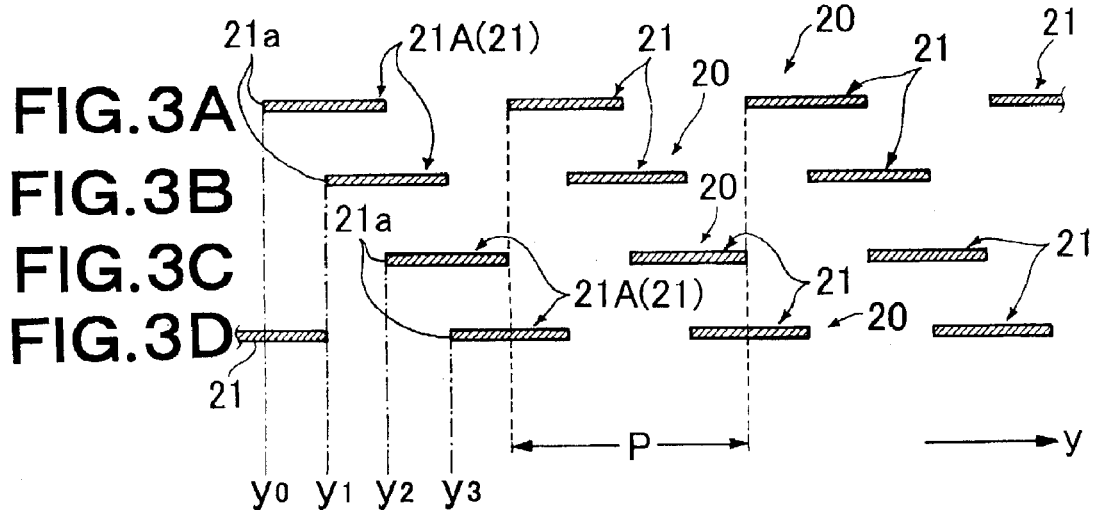
FIG.3A
FIG.3B
FIG.3C
FIG.3D

MOIRÉ GRATING NOISE ELIMINATING METHOD

RELATED APPLICATIONS

This application claims the priority of Japanese Patent Application No. 2002-093311 filed on Mar. 28, 2002, which is incorporated herein by reference.

BACKGROUND OF THE INVENTION

1. Field of the Invention

A grating irradiation type moiré fringe measuring and analyzing method has a moiré grating disposed between a light source and a surface to be inspected. The surface is irradiated with light from the light source so as to project a shadow of the moiré grating onto the surface, and an image of moiré fringes formed by the shadow and moiré grating is captured, so as to analyze the surface shape. The present invention relates to a moiré grating noise eliminating method for eliminating a noise component which occurs when an image of the moiré grating itself is captured in addition to that of moiré fringes.

2. Description of the Prior Art

The grating irradiation type moiré fringe measuring and analyzing method has been in use for measuring and analyzing shapes of various surfaces to be inspected, since it can directly form contour images of object surfaces in a non-contact fashion.

In the grating irradiation type moiré fringe measuring and analyzing method, a moiré grating (also referred to as "reference grating") in which a number of linear grating lines are formed in parallel with each other with a predetermined fine pitch is employed, and irradiation light from the light source projects an image of the moiré grating onto the surface to be inspected. When the surface to be inspected has irregularities, the projected moiré grating shadow deforms according to the form of the surface as seen from a direction different from the light irradiating direction, thus becoming a deformed grating, whereby contour moiré fringes indicating the shape of the surface in terms of overlaps between the deformed grating and moiré grating is observed.

For analyzing the shape of a surface to be inspected with a higher accuracy according to thus obtained moiré fringes, there has recently been known a fringe measuring and analyzing method using a grating irradiation type fringe scanning moiré apparatus which captures a plurality of moiré fringe images while carrying out fringe scanning for shifting the phase of moiré fringes, and analyzes changes in thus captured moiré fringe images by using a computer.

In such moiré fringe analysis, an image of the moiré grating itself may be captured in addition to necessary moiré fringes, thus lowering the accuracy in measurement.

When a region of 25 mm×25 mm is captured by a CCD having 512×512 pixels while using a moiré grating with a grating pitch of 200 $\mu$m, for example, each grating line corresponds to 2 pixels, thereby forming an image. This formed grating image may have noise at the time of image analysis, thereby causing analysis errors.

For eliminating such moiré grating noise, there has been known a method in which a moiré grating is moved (shifted) in a direction perpendicular to each grating line within the plane of the moiré grating, and images are captured during shifting, so as to average images of the moiré grating itself. However, conventional methods in which images are simply captured while shifting the moiré grating without fully taking account of the moiré grating shifting speed or moiré fringe capturing timing have been problematic in that they may not fully eliminate moiré grating noise, thus causing errors in analysis results. In a fringe measuring and analyzing method using a grating irradiation type fringe scanning moiré apparatus for carrying out fringe measurement and analysis with a higher accuracy in particular, highly accurate analysis may not be carried out unless moiré grating noise can fully be eliminated, whereby the elimination of moiré grating noise may become a serious problem.

SUMMARY OF THE INVENTION

In view of such circumstances, it is an object of the present invention to provide a moiré grating noise eliminating method which can favorably eliminate a noise component caused by an image of a moiré grating itself occurring in a grating irradiation type moiré fringe measuring and analyzing method, thus making it possible to carry out accurate moiré fringe image analysis.

For achieving the above-mentioned object, the present invention provides, in a grating irradiation type moiré fringe measuring and analyzing method in which a moiré grating is disposed between a light source and a surface to be inspected. The moiré fringe is irradiated with light from the light source, so as to project a shadow of the moiré grating onto the surface. Moiré fringes formed by the shadow and the moiré grating are captured by imaging means so as to analyze a shape of the surface;

A moiré grating noise eliminating method comprises:

a first step of moving the moiré grating within a grating plane formed by grating lines of the moiré grating in y direction orthogonal to the grating lines by increments of a distance $L_y$ satisfying the following expression (1) from an initial position in the y direction, while capturing an image of the moiré fringes by using the imaging means with an imaging magnification set such that a pixel pitch W of an image pickup device of the imaging means and a grating pitch p of the moiré grating when forming an image on the image pickup device satisfy the condition of the following expression (2) each of times when the moiré grating is located at the initial position and moved by the distance $L_y$, so as to form M y-direction positional moiré fringe images satisfying the condition of the following expression (3):

$$L_y = p/(2n_1) \qquad (1)$$

$$W = p/(2n_1 n_2) \qquad (2)$$

$$M = 2n_1 n_3 \qquad (3)$$

where $n_1$, $n_2$, and $n_3$ are whole numbers;

a second step of averaging thus obtained M y-direction positional moiré fringe images so as to attain an average moiré fringe image; and a third step of determining shape information of the surface according to thus attained average moiré fringe image.

The present invention may be configured such that the moiré grating is moved in z direction perpendicular to the plane of the moiré grating by increments of a predetermined distance $L_z$ from an initial position in the z direction, while the first and second steps are carried out each of times when the moiré grating is located at the initial position in the z direction and moved by the distance $L_z$, so as to obtain the average moiré fringe image at each position in the z direction.

In this case, the moiré grating may return to the initial position in the z direction each time when the step of moving the moiré grating from the initial position in the z direction by the predetermined distance $L_z$ is carried out 4 times.

The predetermined distances $L_y$ and $L_z$ may be set identical to each other.

The first step may be carried out such that the moiré grating is moved in z direction perpendicular to the plane of the moiré grating by a predetermined distance $L_z$ from an initial position in the z direction each of times when the moiré grating is located at the initial position in the y direction and moved by the distance $L_y$ in the y direction, an image of the moiré fringes is captured by the imaging means each time when the moiré grating is moved by the distance $L_z$, and the moiré grating is returned to the initial position in the z direction after a predetermined number of z-direction positional moiré fringe images are obtained; and then the second step is carried out at each position in the z direction, so as to attain the average moiré fringe image at each position in the z direction.

Preferably, the initial position of the moiré grating in the y direction is set such that an image of the grating line is formed on the image pickup device at a position substantially coinciding with a pixel boundary line of the image pickup device.

The above-mentioned "pixel boundary line" refers to not only actual boundary lines dividing pixels, but also boundary lines virtually set between pixels.

After the second step, the average moiré fringe image obtained by the second step may be analytically subjected to low-pass filtering.

After the third step, the shape information of the surface obtained by the third step may be analytically subjected to low-pass filtering.

BRIEF DESCRIPTION OF THE DRAWINGS

FIG. 2 is a diagram schematically showing an example of procedure for carrying out the method of the present invention;

FIGS. 3A to 3D are diagrams showing operations of the procedure shown in FIG. 2;

DESCRIPTION OF THE PREFERRED EMBODIMENTS

In the following, an embodiment of the present invention will be explained with reference to the drawings.

Configuration of Apparatus

Figure 1:
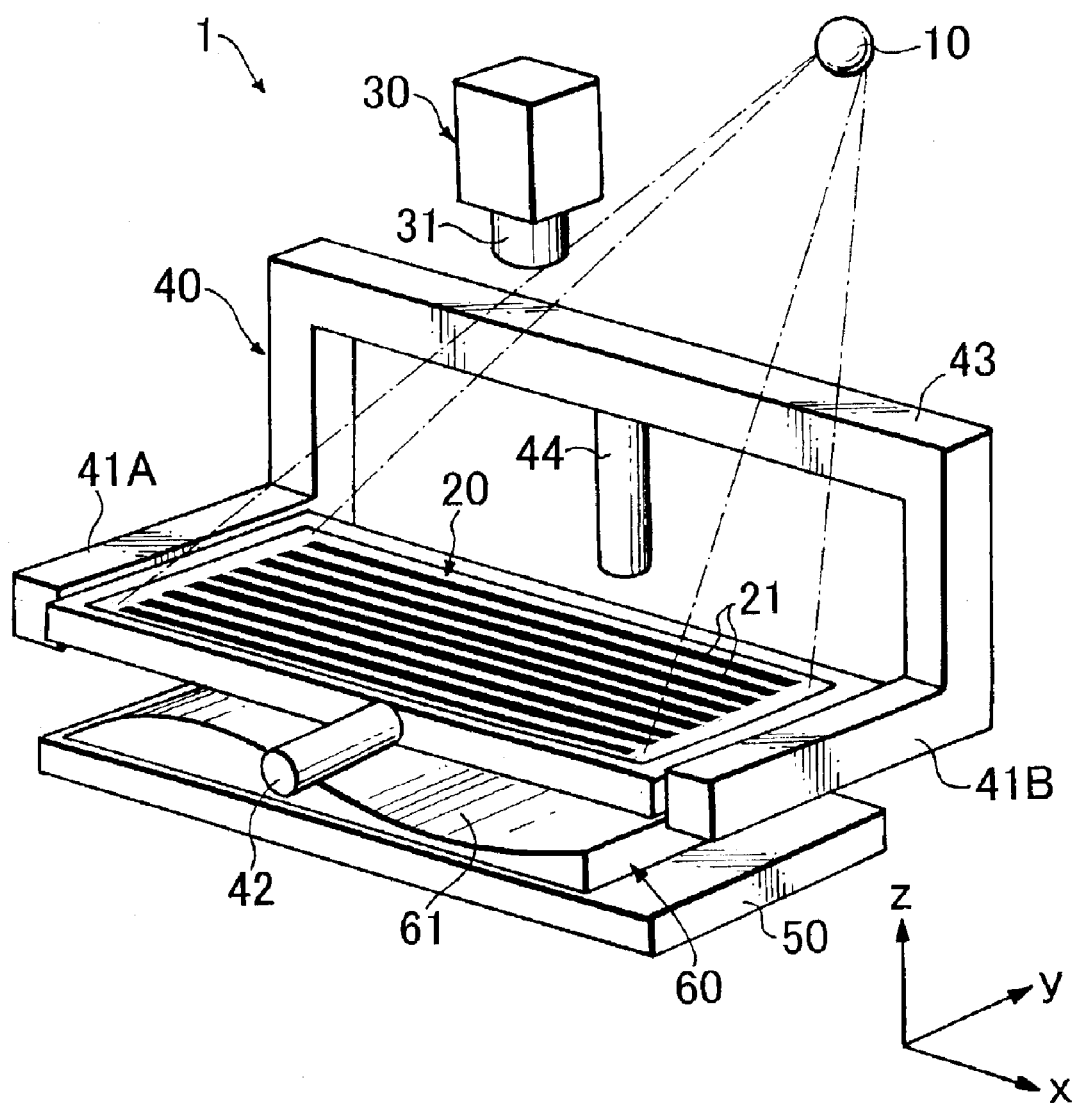
FIG. 1 is a schematic view of a grating irradiation type moiré apparatus for carrying out the method of the present invention.

FIG. 1 is a schematic view showing a grating irradiation type fringe scanning moiré apparatus for carrying out the method of the present invention. The grating irradiation type fringe scanning moiré apparatus 1 (also simply referred to as "moiré apparatus 1" in the following) is an apparatus which utilizes moiré fringes so as to analyze the shape of a surface (surface to be inspected 61) of an object to be inspected 60 such as an optical member horizontally mounted on a sample stage 50. The moiré apparatus 1 comprises a light source 10 constituted by a halogen lamp or the like, a moiré grating 20 horizontally arranged between the light source 10 and the surface to be inspected 61, an imaging means 30 constituted by a CCD camera, and a moving means 40 for moving the moiré grating 20 in y direction in the drawing by increments of a predetermined distance $L_y$ while keeping the posture thereof.

On the surface of the moiré grating 20, a number of linear grating lines 21 are formed in parallel with each other with a predetermined fine pitch therebetween. In FIG. 1, a direction in which each grating line 21 extends is defined as x direction, a direction orthogonal to the x direction within a grating plane formed by the grating lines 21 is defined as y direction, and the direction vertically upward from the grating plane is defined as z direction.

The imaging means 30 comprises a zoom lens system disposed within a lens barrel 31 and a CCD as an image pickup device disposed downstream the zoom lens system (both of which are not depicted). The imaging means 30 captures an image of moiré fringes formed by a shadow of the moiré grating 20 projected onto the surface 61 upon irradiation of the moiré grating 20 with light from the light source 10 and the grating lines 21 of the moiré grating 20, and transmits image information of thus captured moiré fringes to undepicted image display apparatus and image analyzing apparatus. Above the moiré grating 20, the imaging means 30 is disposed so as to align with the light source 10 in a direction (equivalent to y direction) orthogonal to the grating lines 21 of the moiré grating 20 while being separated from the light source 10 by a predetermined distance.

The moving means 40 comprises a pair of guide parts 41A, 41B opposed to each other while holding the moiré grating 20 therebetween, whereas the respective surfaces of pair of guide parts 41A, 41B opposed to each other are formed with guide rails (not depicted) extending in the y direction. The moving means 40 comprises a driving actuator 42, which moves the moiré grating 20 by increments of the predetermined distance $L_y$ along the guide rails while keeping its posture. The moving means 40 further comprises a joint part 43 connecting the pair of guide parts 41A, 41B to each other, and is supported by a Z stage which is not depicted. Also, the moving means 40 is configured so as to be movable by the driving actuator 44 disposed between the joint part 43 and the Z stage by increments of a predetermined distance $L_z$ in the z direction, while keeping its posture, together with the moiré grating 20.

Procedures for carrying out the method of the present invention using the moiré apparatus 1 will now be explained. FIG. 2 is a schematic diagram for explaining an example of procedure in an embodiment of the present invention.

PROCEDURE EXAMPLE 1

S1: A moving distance $L_y$ of the moiré grating 20 in y direction is set. It is set in this procedure example 1, for instance, such that the distance $L_y$ and the grating pitch p of the moiré grating 20 satisfy the condition of the following expression (4):

$$L_y = p/(2n_1) \tag{4}$$

where $n_1$ is 2. Namely, the distance $L_y$ is set to a length corresponding to a quarter of the grating pitch. When the grating pitch p is 200 μm, for example, the distance $L_y$ becomes 50 μm.

S2: The object to be inspected 60 and the individual constituent means of the moiré apparatus are arranged in the state shown in FIG. 1, and the moiré grating 20 is irradiated with light from the light source 10, so as to project a shadow of the moiré grating 20 onto the surface 61, thereby generating moiré fringes.

S3: The zoom lens system of the imaging means 30 is adjusted so as to set an imaging magnification. In this procedure example 1, for instance, the imaging magnification is set such that the pixel pitch W of an image pickup device in the imaging means 30 and the grating pitch p at the time when the moiré grating 20 forms an image on the image pickup device satisfy the condition of the following expression (5):

$$W=p/(2n_1n_2) \tag{5}$$

where $n_1$ is 2, and $n_2$ is 1. Namely, the imaging magnification is set such a value that a quarter of the grating pitch p forms an image within one pixel pitch W of the image pickup device.

Here, the imaging magnification is set such that an image of the whole region for measuring the surface to be inspected 61 can be captured. The imaging magnification can be set while observing the display screen in the image display apparatus. In this case, the imaging magnification can easily be adjusted if the position of the moiré grating 20 in y direction is regulated such that the images of grating lines 21 formed on the image pickup device coincide with the individual pixel boundary lines of the image pickup device, respectively.

S4: The position of the moiré grating 20 at the stage having completed the foregoing steps S1 to S3 is defined as y-direction initial position $y_0$ and z-direction initial position $z_0$. The imaging means 30 captures an image of moiré fringes at the time when the moiré grating 20 is located at the y-direction initial position $y_0$ and z-direction initial position $z_0$ (when the left end part 21$a$ of the grating line 21A shown at the left end of FIG. 2 coincides with the $y_0$ position whereas the upper face of the moiré grating 20 coincides with the $z_0$ position).

S5: The moiré grating 20 is moved by increments of a predetermined distance $L_z$ without changing its position in the y direction. An image of moiré fringes is captured by the imaging means 30 each time when the moiré grating is moved by the distance $L_z$ in the z direction, whereby a z-direction positional moiré fringe image is obtained at each of positions $z_1, z_2, z_3$ in the z direction shown in FIG. 2 (thus yielding 4 moiré fringe images including the one captured at the $z_0$ position).

The moving distance $L_z$ in the z direction is set according to the fringe scanning (also known as "phase shifting") using the moving distance of moiré grating 20 in the z direction shifting the moiré fringes by one phase and the stepping. The fringe scanning is a method in which, in interferometry, for example, the optical path length difference of an interferometer is changed during measurement, and a phase is determined according to fluctuations in interference fringes caused by the change in optical path length difference. It is a technique conventionally used in general in order to carry out highly accurate measurement. The stepping is a technique for capturing and analyzing fringe images, in which the phase is shifted stepwise in the fringe scanning, and fringes changing at each step are captured at the respective step. Prefixed with the number of steps (number of operations for capturing fringe images) set during when the phase is changed by one period, the technique is referred to as N-stepping (where N is an integer of 3 or greater). For example, it is called 4-stepping when capturing images four times.

In this procedure example 1, for instance, the 4-stepping is employed. When a grating irradiation moiré apparatus in which the light source 10 and the imaging means 30 are arranged such that the phase of moiré fringes shifts by one phase each time the moiré grating 20 moves by one grating pitch in the z direction is used, the moving distance $L_z$ of the moiré grating 20 in the z direction becomes a length corresponding to a quarter of the grating pitch p as with the moving distance $L_y$ in the y direction.

S6: The moiré grating 20 is returned to the z-direction initial position $z_0$ without changing its position in the y direction.

S7: The moiré grating 20 is moved to $y_1$ position distanced from the $y_0$ position by the distance $L_y$ in the y direction without changing its position in the z direction. The imaging means 30 captures an image of moiré fringes at the time when the moiré grating 20 is located at the $y_1$ position (while at the z-direction initial position $z_0$ in the z direction), i.e., when the left end part 21$a$ of the grating line 21A shown at the left end of FIG. 2 coincides with the $y_1$ position whereas each grating line 21 coincides with the $z_0$ position.

S8: The above-mentioned S5 and S6 are carried out.

S9: The moiré grating 20 is moved to $y_2$ position distanced from the $y_1$ position by the distance $L_y$ in the y direction without changing its position in the z direction. The imaging means 30 captures an image of moiré fringes at the time when the moiré grating 20 is located at the $y_2$ position (while at the z-direction initial position $z_0$ in the z direction), i.e., when the left end part 21$a$ of the grating line 21A shown at the left end of FIG. 2 coincides with the $y_2$ position whereas the upper face of the moiré grating 20 coincides with the $z_0$ position.

S10: The above-mentioned S5 and S6 are carried out.

S11: The moiré grating 20 is moved to $y_3$ position distanced from the $y_2$ position by the distance $L_y$ in the y direction without changing its position in the z direction. The imaging means 30 captures an image of moiré fringes at the time when the moiré grating 20 is located at the y3 position (while at the z-direction initial position $z_0$ in the z direction), i.e., when the left end part 21$a$ of the grating line 21A shown at the left end of FIG. 2 coincides with the $y_3$ position whereas the upper face of the moiré grating 20 coincides with the $z_0$ position.

S12: The above-mentioned S5 and S6 are carried out.

S13: The y-direction positional moiré fringe images obtained by M each for the individual positions $z_1, z_2, z_3$ in the z direction in the foregoing steps up to S12 are averaged at each of the positions $z_1, z_2, z_3$ in the z direction, whereby average moiré fringe images are obtained at the respective positions $z_1, z_2, z_3$ in the z direction. Here, M satisfies the condition of the following expression (6):

$$M=2n_1n_3 \tag{6}$$

where $n_1$ is 2, and $n_3$ is 1. Namely, M is 4.

FIGS. 3A to 3D are schematic diagrams for explaining an operation of averaging 4 y-direction positional moiré fringe images. FIGS. 3A to 3D show stepwise how the moiré grating 20 moves by the distance $L_y$ in the y direction. Because of the above-mentioned setting, the grating pitch p shown in FIGS. 3A to 3D corresponds to the width of 4 pixels on the image pickup device. Therefore, if the respective moiré fringe images obtained when the moiré grating 20 is located at the positions of FIGS. 3A to 3D are averaged, a state similar to that obtained when an image of the grating lines 21 will be captured twice at each pixel can be attained, whereby the noise component caused by images of the moiré grating can be eliminated favorably.

Each of thus obtained average moiré fringe images may be subjected to analytical low-pass filtering with FFT or the like, so as to further eliminate the noise component.

S14: Information obtained from the average moiré fringe images attained at S13 is subjected to shape analysis using known image analyzing and phase unwrapping methods in an image analyzing apparatus, so as to determine phase information of the surface to be inspected 61.

Thus determined shape information of the surface 61 may be subjected to analytical low-pass filtering with FFT or the like, so as to further eliminate the noise component.

In the foregoing procedure example 1, an operation of returning the moiré grating 20 to the z-direction initial position $z_0$ and an operation of moving the moiré grating 20 to a position advanced by the distance $L_y$ in the y direction may be carried out simultaneously.

PROCEDURE EXAMPLE 2

Procedure example 2 will now be explained. The individual steps of this procedure example 2 will be referred to as T1, T2, . . . .

T1 to T4 carry out operations similar to those of S1 to S4 in the above-mentioned procedure example 1.

T5: The moiré grating 20 is moved by increments of the predetermined distance $L_y$ in the y direction without changing its position in the z direction. An image of moiré fringes is captured by the imaging means 30 each time when the moiré grating is moved by the distance $L_y$ in the y direction, whereby a y-direction positional moiré fringe image is obtained at each of positions $y_1$, $y_2$, $y_3$ in the y direction shown in FIG. 2 (thus yielding 4 moiré fringe images including the one captured at the $y_0$ position).

T6: The moiré grating 20 is returned to the y-direction initial position $y_0$ and z-direction initial position $z_0$.

T7: The moiré grating 20 is moved to position $z_1$ distanced from the $z_0$ position by the distance $L_z$ in the z direction shown in FIG. 2 without changing its position in the y direction. The imaging means 30 captures an image of moiré fringes at the time when the moiré grating 20 is located at the $z_1$ position (while at the y-direction initial position $y_0$ in the y direction).

T8: The above-mentioned T5 is carried out at the above-mentioned $z_1$ position.

T9: The moiré grating 20 is returned to the y-direction initial position $y_0$ and z-direction $z_1$ position.

T10: The moiré grating 20 is moved to position $z_2$ in the z direction shown in FIG. 2 without changing its position in the y direction. The imaging means 30 captures an image of moiré fringes at the time when the moiré grating 20 is located at the $z_2$ position (while at the y-direction initial position $y_0$ in the y direction).

T11: The above-mentioned T5 is carried out at the above-mentioned $z_2$ position.

T12: The moiré grating 20 is returned to the y-direction initial position $y_0$ and z-direction $Z_2$ position.

T13: The moiré grating 20 is moved to position $Z_3$ in the z direction shown in FIG. 2 without changing its position in the y direction. The imaging means 30 captures an image of moiré fringes at the time when the moiré grating 20 is located at the $z_3$ position (while at the y-direction initial position $y_0$ in the y direction).

T14: The above-mentioned T5 is carried out at the above-mentioned $z_3$ position.

T15: The y-direction positional moiré fringe images obtained by M (4) each for the individual positions $z_1$, $z_2$, $z_3$ in the z direction in the foregoing steps up to T14 are averaged at each of the positions $z_1$, $z_2$, $z_3$ in the z direction, whereby average moiré fringe images are obtained at the respective positions $z_1$, $z_2$, $z_3$ in the z direction.

Each of thus obtained average moiré fringe images may be subjected to analytical low-pass filtering with FFT or the like, so as to further eliminate the noise component.

T16: Information obtained from the average moiré fringe images attained at T15 is subjected to shape analysis using known image analyzing and phase unwrapping methods in an image analyzing apparatus, so as to determine phase information of the surface to be inspected 61.

Thus determined shape information of the surface 61 may be subjected to analytical low-pass filtering with FFT or the like, so as to further eliminate the noise component.

In the foregoing procedure example 2, an operation of returning the moiré grating 20 to the y-direction initial position $y_0$ and an operation of moving the moiré grating 20 to a position advanced by the distance $L_z$ in the z direction may be carried out simultaneously.

EXAMPLES

Figure 4:
FIG. 4 is a view showing results of analysis in accordance with an embodiment of the present invention.
Figure 5:
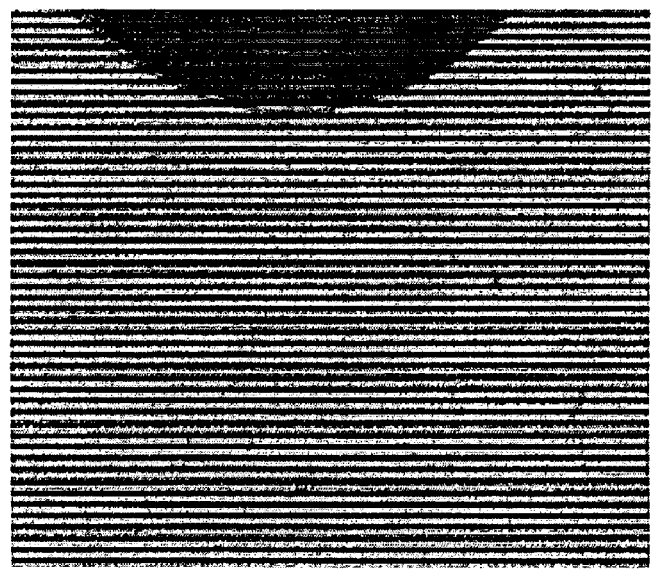
FIG. 5 is a view showing results of analysis obtained by a conventional technique.

FIGS. 4 and 5 show an example in accordance with the method of the present invention and a comparative example in accordance with a conventional technique. The example of FIG. 4 and the comparative example of FIG. 5 verify that the noise component caused by an image of the moiré grating itself can be eliminated favorably by the method in accordance with the present invention.

Though an embodiment of the present invention is explained in the foregoing, the present invention can be modified in various manners without being restricted to the above-mentioned embodiment.

For example, though the number of steps for moving the moiré grating in the z direction is 4 in the above-mentioned embodiment, any step number can be set.

Also, the moving distance $L_y$ of the moiré grating in the y direction, the imaging magnification of imaging means, and the number M of y-direction positional moiré fringes to be captured can be set arbitrarily so as to satisfy the conditions of the above-mentioned expressions (4) to (6), respectively.

Though the above-mentioned embodiment shows an example in which the moving distance $L_y$ of the moiré grating in the y direction and its moving distance $L_z$ in the z direction equal each other, it is not restrictive. Depending on setting of contour moiré fringe occurring sensitivity, i.e., the setting of a contour moiré fringe imaging optical system, $L_y$ and $L_x$ can be set to respective values different from each other.

In the moiré grating noise eliminating method of the present invention, as explained in detail in the foregoing, the moving distance $L_y$ of the moiré grating in the y direction is set with respect to the grating pitch p, the imaging magnification of the imaging means is set with respect to the relationship between the pixel pitch W of the image pickup device and the size of the grating pitch p when forming an image on the image pickup device. Thereafter, an image of moiré fringes is captured each time when the moiré grating is moved by the distance $L_y$ in the y direction, so as to yield a predetermined number of y-direction positional moiré fringe images, which are then averaged. According to thus obtained average moiré fringe image, shape information of the surface to be inspected is determined. Therefore, the noise component caused by an image of the moiré grating itself can be eliminated favorably, thus making it possible to obtain shape information of the surface to be inspected while lowering errors in analysis.

What is claimed is:

1. In a grating irradiation type moiré fringe measuring and analyzing method in which a moiré grating disposed between a light source and a surface to be inspected is irradiated with light from said light source, so as to project a shadow of said moiré grating onto said surface, and moiré fringes formed by said shadow and said moiré grating are captured by imaging means so as to analyze a shape of said surface;

a moiré grating noise eliminating method comprising:

a first step of moving said moiré grating within a grating plane formed by grating lines of said moiré grating in y direction orthogonal to said grating lines by increments of a distance $L_y$ satisfying the following expression (1) from an initial position in said y direction, while capturing an image of said moiré fringes by using said imaging means with an imaging magnification set such that a pixel pitch W of an image pickup device of said imaging means and a grating pitch p of said moiré grating when forming an image on said image pickup device satisfy the condition of the following expression (2) each of times when said moiré grating is located at said initial position and moved by said distance $L_y$, so as to form M y-direction positional moiré fringe images satisfying the condition of the following expression (3):

$$L_y = p/(2n_1) \quad (1)$$

$$W = p/(2n_1 n_2) \quad (2)$$

$$M = 2n_1 n_3 \quad (3)$$

where $n_1$, $n_2$, and $n_3$ are natural numbers;

a second step of averaging thus obtained M y-direction positional moiré fringe images so as to attain an average moiré fringe image; and a third step of determining shape information of said surface according to thus attained average moiré fringe image.

2. A moiré grating noise eliminating method according to claim 1, wherein said moiré grating is moved in z direction perpendicular to said plane of said moiré grating by increments of a predetermined distance $L_z$ from an initial position in said z direction, while said first and second steps are carried out each of times when said moiré grating is located at said initial position in said z direction and moved by said distance $L_z$, so as to obtain said average moiré fringe image at each position in said z direction.

3. A moiré grating noise eliminating method according to claim 2, wherein said moiré grating returns to said initial position in said z direction each time when the step of moving said moiré grating from said initial position in said z direction by said predetermined distance $L_z$ is carried out 4 times.

4. A moiré grating noise eliminating method according to claim 2, wherein said predetermined distances $L_y$ and $L_z$ are set identical to each other.

5. A moiré grating noise eliminating method according to claim 1, wherein, in said first step, said moiré grating is moved in z direction perpendicular to said plane of said moiré grating by a predetermined distance $L_z$ from an initial position in said z direction each of times when said moiré grating is located at said initial position in said y direction and moved by said distance $L_y$ in said y direction, an image of said moiré fringes is captured by said imaging means each time when said moiré grating is moved by said distance $L_z$, and said moiré grating is returned to said initial position in said z direction after a predetermined number of z-direction positional moiré fringe images are obtained; and then said second step is carried out at each position in said z direction, so as to attain said average moiré fringe image at each position in said z direction.

6. A moiré grating noise eliminating method according to claim 1, wherein said initial position of said moiré grating in said y direction is set such that an image of said grating line is formed on said image pickup device at a position substantially coinciding with a pixel boundary line of said image pickup device.

7. A moiré grating noise eliminating method according to claim 1, wherein, after said second step, said average moiré fringe image obtained by said second step is analytically subjected to low-pass filtering.

8. A moiré grating noise eliminating method according to claim 1, wherein, after said third step, said shape information of said surface obtained by said third step is analytically subjected to low-pass filtering.

* * * * *